United States Patent
Long et al.

(10) Patent No.: US 11,235,392 B2
(45) Date of Patent: Feb. 1, 2022

(54) MONITORING MATERIAL SOLDIFICATION BYPRODUCTS DURING ADDITIVE MANUFACTURING

(71) Applicant: United Technologies Corporation, Farmington, CT (US)

(72) Inventors: Yu Long, Ithaca, NY (US); Yan Zhang, Vernon, CT (US); Sergey Mironets, Charlotte, NC (US); Tahany Ibrahim El-Wardany, Bloomfield, CT (US); Agnes Klucha, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 610 days.

(21) Appl. No.: 15/111,406

(22) PCT Filed: Jan. 22, 2015

(86) PCT No.: PCT/US2015/012474
§ 371 (c)(1),
(2) Date: Jul. 13, 2016

(87) PCT Pub. No.: WO2015/112726
PCT Pub. Date: Jul. 30, 2015

(65) Prior Publication Data
US 2016/0332381 A1    Nov. 17, 2016

Related U.S. Application Data

(60) Provisional application No. 61/931,339, filed on Jan. 24, 2014.

(51) Int. Cl.
*B22F 10/20*    (2021.01)
*B33Y 10/00*    (2015.01)
(Continued)

(52) U.S. Cl.
CPC .............. *B22F 10/20* (2021.01); *B28B 1/001* (2013.01); *B28B 17/0081* (2013.01);
(Continued)

(58) Field of Classification Search
CPC . B29C 67/0088; B29C 64/153; B29C 64/386; B33Y 10/00; B33Y 30/00;
(Continued)

(56) References Cited

U.S. PATENT DOCUMENTS

| 6,554,057 B1 | 4/2003 | Arnold |
| 7,045,738 B1 | 5/2006 | Kovacevic et al. |

(Continued)

FOREIGN PATENT DOCUMENTS

| EP | 1795887 A1 | 6/2007 |
| JP | 08318574 | 12/1996 |
| JP | 08338753 | 12/1996 |

OTHER PUBLICATIONS

EP search report for EP15740842.8 dated Jan. 25, 2017.

*Primary Examiner* — Michael P Wieczorek
(74) *Attorney, Agent, or Firm* — Getz Balich LLC

(57) ABSTRACT

A system is provided for additively manufacturing a part. This additive manufacturing system includes a base, a solidification device and a detection device. The base is adapted to support material; e.g., powder material. The solidification device is adapted to solidify at least a portion of the supported material to form at least a portion of the part. The detection device is adapted to detect emissions produced by the solidification of at least a portion of the material.

19 Claims, 4 Drawing Sheets

(51) Int. Cl.
  *B33Y 50/02* (2015.01)
  *B29C 64/153* (2017.01)
  *B28B 1/00* (2006.01)
  *B33Y 30/00* (2015.01)
  *B28B 17/00* (2006.01)
  *B22F 10/30* (2021.01)

(52) U.S. Cl.
  CPC ............ *B29C 64/153* (2017.08); *B33Y 10/00* (2014.12); *B33Y 30/00* (2014.12); *B33Y 50/02* (2014.12); *B22F 10/30* (2021.01); *B22F 2998/10* (2013.01); *B22F 2999/00* (2013.01); *Y02P 10/25* (2015.11)

(58) Field of Classification Search
  CPC ....... B33Y 50/02; B22F 3/1055; B28B 1/001; B28B 17/0081
  See application file for complete search history.

(56) References Cited

U.S. PATENT DOCUMENTS

| | | | |
|---|---|---|---|
| 7,777,155 B2 | 8/2010 | Twelves, Jr. et al. | |
| 7,789,037 B2 | 9/2010 | Teulet | |
| 8,187,522 B2* | 5/2012 | Higashi | B22F 3/003 264/37.14 |
| 8,303,886 B2 | 11/2012 | Philippi | |
| 8,383,985 B2 | 2/2013 | Twelves, Jr. et al. | |
| 8,460,755 B2 | 6/2013 | Rodgers | |
| 8,488,994 B2 | 7/2013 | Hanson et al. | |
| 8,570,534 B1 | 10/2013 | Loewgren | |
| 8,915,290 B2 | 12/2014 | Müller | |
| 2004/0204785 A1 | 10/2004 | Richardson | |
| 2007/0205184 A1 | 9/2007 | Mazumder et al. | |
| 2009/0152771 A1* | 6/2009 | Philippi | B33Y 10/00 264/410 |
| 2009/0200275 A1 | 8/2009 | Twelves, Jr. et al. | |
| 2009/0206065 A1* | 8/2009 | Kruth | B22F 3/1055 219/121.66 |
| 2011/0061591 A1 | 3/2011 | Stecker | |
| 2012/0100031 A1* | 4/2012 | Ljungblad | B29C 64/153 419/7 |
| 2012/0152916 A1* | 6/2012 | Oowaki | B23K 26/03 219/121.64 |
| 2012/0164322 A1 | 6/2012 | Teulet | |
| 2012/0228807 A1 | 9/2012 | Teulet | |
| 2013/0277891 A1 | 10/2013 | Teulet | |
| 2014/0140882 A1* | 5/2014 | Syassen | B22F 3/003 419/53 |
| 2016/0067779 A1 | 3/2016 | Dautova et al. | |
| 2016/0236279 A1* | 8/2016 | Ashton | B22F 3/1055 |

* cited by examiner

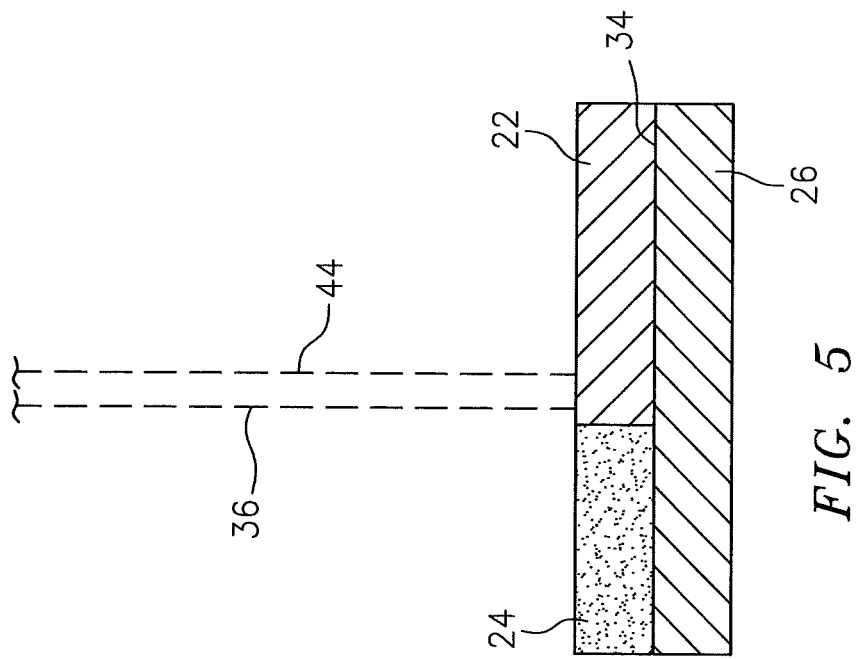
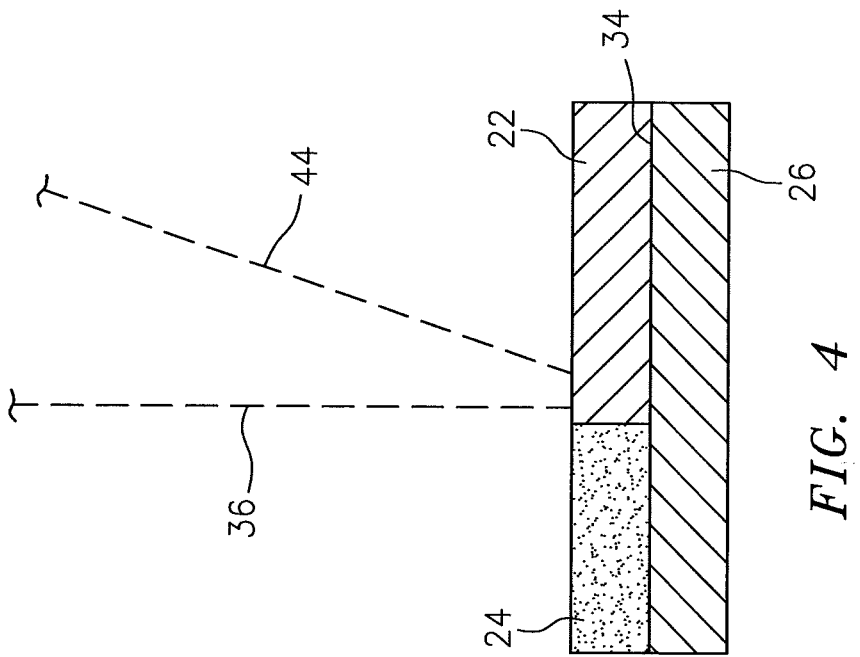

MONITORING MATERIAL SOLDIFICATION BYPRODUCTS DURING ADDITIVE MANUFACTURING

This application claims priority to PCT Patent Application No. PCT/US15/012474 filed Jan. 22, 2015 which claims priority to U.S. Patent Application No. 61/931,339 filed Jan. 24, 2014, which are hereby incorporated herein by reference in their entireties.

BACKGROUND OF THE INVENTION

1. Technical Field

This disclosure relates generally to additive manufacturing.

2. Background Information

Various additive manufacturing processes are known in the art for forming one or more parts. The term "additive manufacturing" may describe a process where a part or parts are formed by accumulating and/or fusing material together, typically in a layer-on-layer manner. Layers of powder material, for example, may be disposed and thereafter solidified sequentially onto one another to form the part(s). The term "solidify" may describe a process whereby material is sintered or otherwise melted thereby causing discrete particles of the sintered or melted material to fuse together.

An additively manufactured part may have various defects where its powder material was not fully fused during solidification and/or its powder material was partially vaporized during solidification. Powder material within the part, for example, may compromise the structural integrity of the part. Powder material vaporization during solidification may increase porosity within the solidified material, which may also compromise the structural integrity of the part. Parts with such defects therefore are typically discarded, which can increase manufacturing costs and time. In addition, it is difficult to determine whether a part has defect without destructive testing, which can also increase manufacturing costs and time.

There is a need in the art for improved additive manufacturing systems and processes that can detect and/or reduce part defects.

SUMMARY OF THE DISCLOSURE

According to an aspect of the invention, a system is provided for additively manufacturing a part. This additive manufacturing system includes a base, a solidification device and a detection device. The base is adapted to support material; e.g., powder material. The solidification device is adapted to solidify at least a portion of the supported material to form at least a portion of the part. The detection device is adapted to detect emissions produced by the solidification of at least a portion of the material.

According to another aspect of the invention, a system is provided for manufacturing a part. This manufacturing system includes a solidification device and a detection device. The solidification device is adapted to solidify material with an energy beam to form at least a portion of the part. The detection device is adapted to detect one or more byproducts from the solidification of at least a portion of the material.

According to still another aspect of the invention, a process is provided for additively manufacturing a part. The process includes solidifying material with an energy beam to form at least a portion of the part. The process also includes detecting emissions produced by the solidification of at least a portion of the material using a detection device.

The manufacturing system may be configured as or include an additive manufacturing system.

The solidification device may be adapted to solidify the respective material with an energy beam that moves over the respective material. The detection device may be adapted to detect emissions following the energy beam.

The solidification device may be adapted to solidify the respective material with an energy beam. The detection device may be adapted to detection emissions at a location where the energy beam fuses the respective material.

The detection device may be configured as or include a spectrometer; e.g., a mass spectrometer.

The system may include a processing system adapted to receive data from the detection device indicative of the detected emissions. This processing system may also be adapted to determine a species of at least one chemical component in the emissions. In addition or alternatively, the processing system may be adapted to determine a concentration of at least one chemical component in the emissions. In addition or alternatively, the processing system may be adapted to predict whether the solidification of the respective material will produce a defect within the part. In addition or alternatively, the processing system may be adapted to control operation of the solidification device based on the data. For example, the processing system may be adapted to control one or more of the following parameters of an energy beam generated by the solidification device based on the data: power, pulse width, and speed the energy beam moves.

The system may include a processing system adapted to receive data from the detection device indicative of the detected byproduct(s). This processing system may also be adapted to determine a species of at least one chemical component in the byproduct(s). In addition or alternatively, the processing system may be adapted to determine a concentration of at least one chemical component in the byproduct(s). In addition or alternatively, the processing system may be adapted to predict whether the solidification of the respective material will produce a defect within the part. In addition or alternatively, the processing system may be adapted to control operation of the solidification device based on the data. For example, the processing system may be adapted to control one or more of the following parameters of the energy beam based on the data: power, pulse width, spot size, speed the energy beam moves, and hatch spacing, etc.

The solidification device may be adapted to generate an energy beam to solidify the respective material.

The energy beam may be a laser beam or an electron beam.

The process may include moving the energy beam over the material, wherein the emissions is detected following the energy beam.

The emissions may be detected at a location where the energy beam fuses the respective material.

The process may include determining a species of at least one chemical component in the detected emissions.

The process may include determining a concentration of at least one chemical component in the detected emissions.

The process may include predicting whether the solidification of the respective material will produce a defect within the part based on the detected emissions.

The process may include controlling operation of a device generating the energy beam based on the detected emissions.

The foregoing features and the operation of the invention will become more apparent in light of the following description and the accompanying drawings.

BRIEF DESCRIPTION OF THE DRAWINGS

FIGS. 4 and 5 are sectional illustrations of material being solidified and monitored by additive manufacturing systems.

DETAILED DESCRIPTION OF THE INVENTION

Figure 1:
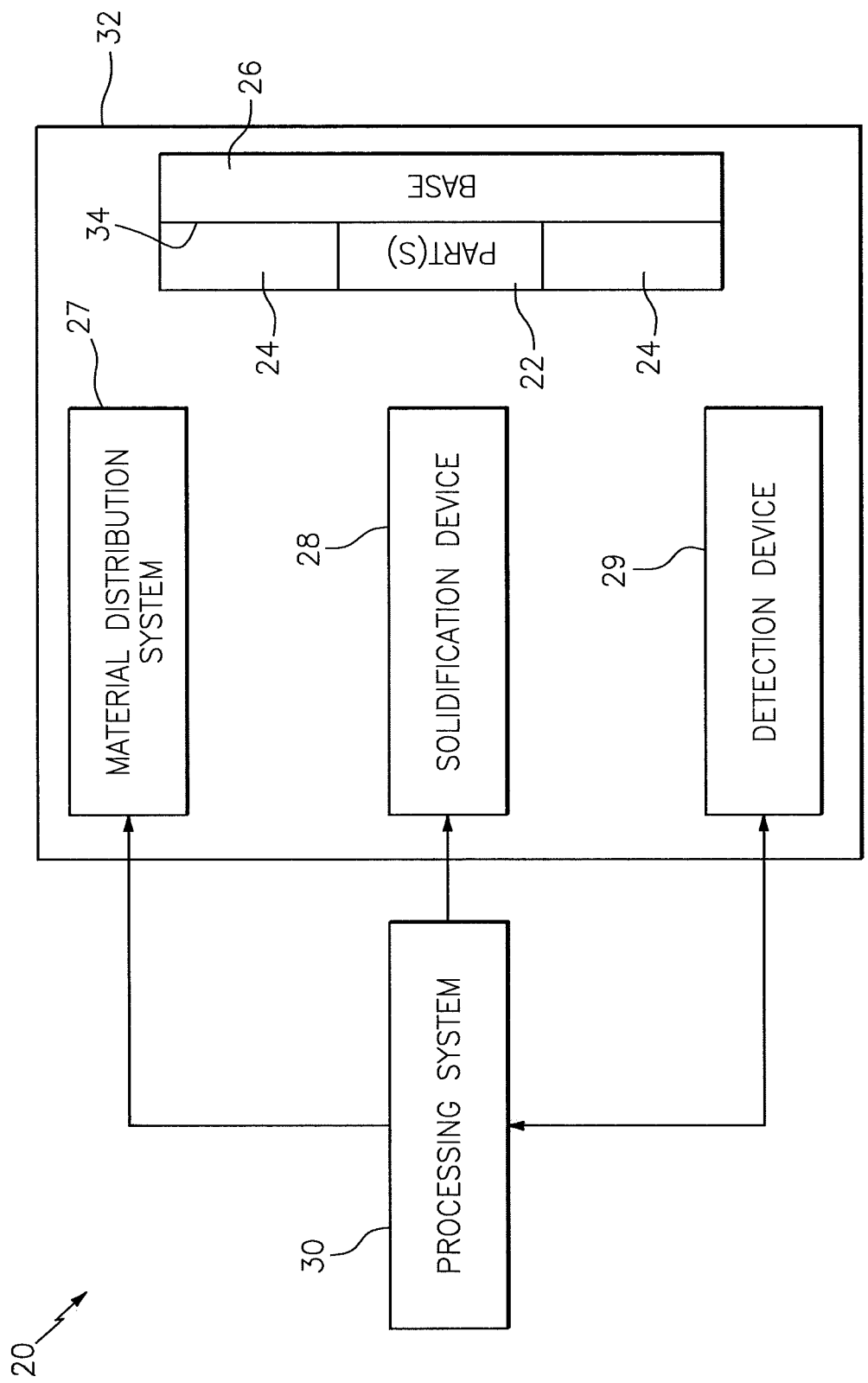
FIG. 1 is a block diagram of an additive manufacturing system.

FIG. 1 illustrates a system 20 for additively manufacturing a part or parts 22 from additive manufacturing material 24. Examples of additive manufacturing material include ceramic powder and metal powder, and a mixture of ceramic, polymer and/or metal powders. Examples of ceramic powder include oxide ceramics such as Al2O3 or ZrO2, and nitride ceramics such as aluminum nitride, silicon nitride, etc. Examples of metal powder include nickel or nickel alloy powder, and titanium or titanium alloy powder. Another example of metal powder is ferrous metals such as, for example, steel alloys, stainless steel. Still another example of metal powder is non-ferrous metals such as, for example, aluminum, bronze, cobalt alloys, etc. Examples of mixture powder include Al-silicon metal matrix composite, WC-Co cermets, polymer encapsulated SiC powders, polymer-precused aluminum powders, etc. The additive manufacturing system 20, of course, may also or alternatively additively manufacture part(s) from one or more types and/or forms of material other than those described above.

The additive manufacturing system 20 includes a base 26, a material distribution system 27, a solidification device 28 and a detection device 29. The additive manufacturing system 20 also includes a processing system 30 in signal communication (e.g., hardwired and/or wirelessly coupled) with one or more of the system components 27-29.

The base 26 may be configured as or located within an enclosed housing 32 (e.g., a seal enclosure) in which at least a portion of one or more of the system components 27-29 are located. The base 26 includes a support surface 34. This support surface 34 is adapted to support the material 24 and/or at least a portion of the part(s) 22 during additive manufacturing. The support surface 34, for example, may be substantially horizontal relative to gravity. The support surface 34 may also have a generally planar geometry.

The material distribution system 27 is adapted to deposit a quantity of the material 24 onto the support surface 34. This quantity of material 24 may be deposited as a substantially uniform layer of material 24 over at least a portion or all of the support surface 34. The material distribution system 27, for example, may include a material reservoir (e.g., a hopper), a material outlet (e.g., a conduit) and a material coater (e.g., a blade). The outlet is adapted to direct material 24 from the reservoir onto the support surface 34 into a mound. The coater is adapted to spread the mound of material 24 across at least a portion of the support surface 34 to provide the layer of material 24. Of course, various other types and configurations of material distribution systems are known in the art, and the additive manufacturing system 20 is not limited to including any particular ones thereof.

The solidification device 28 is adapted to solidify at least a portion or all of the material 24 deposited on the support surface 34 to form at least a portion of the part(s) 22. For example, where the material 24 is metal powder, the solidification device 28 may sinter or melt at least some of the metal powder such that the sintered or melted powder fuses together to form a portion of the part(s) 22.

Figure 2:
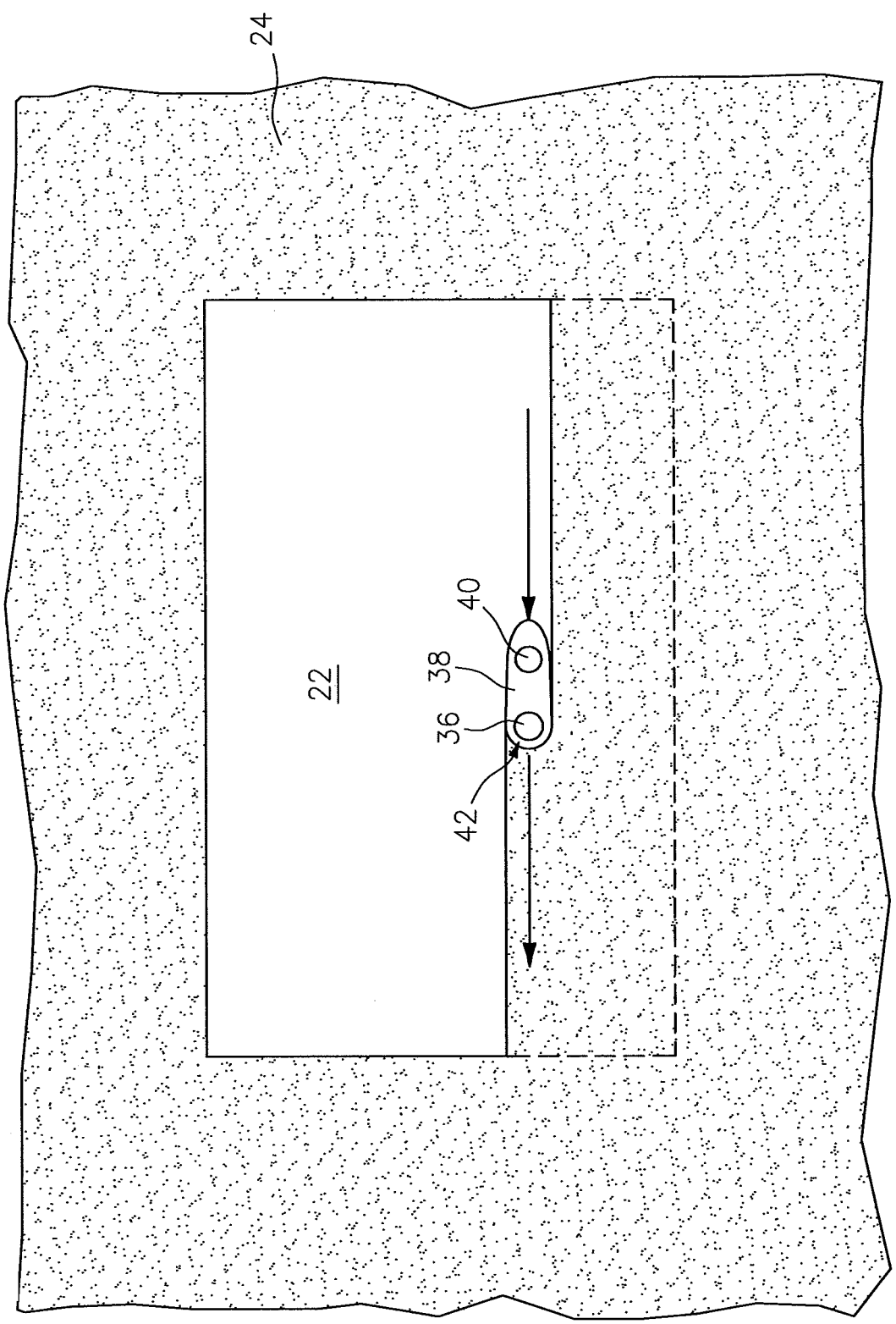
FIG. 2 is a top view illustration of material being solidified and monitored by an additive manufacturing system.

The solidification device 28 may include an energy beam source such as, for example, a laser or an electron beam energy source. Referring to FIGS. 1 and 2, the energy beam source is adapted to generate at least one energy beam 36 (e.g., a laser or electron beam) for sintering, melting or otherwise fusing a portion of the deposited material 24 together. The energy beam source is also adapted to move the energy beam 36 over (e.g., selectively scan) at least a portion of the deposited material 24 as illustrated, for example, in FIG. 2. Of course, various other types and configurations of solidification devices are known in the art, and the additive manufacturing system 20 is not limited to including any particular ones thereof.

During material solidification (e.g., in region 38), the material 24 may undergo one or more physical and/or chemical changes that release and/or produce one or more byproducts; e.g., gaseous emissions. The chemical composition and/or the concentration of these solidification byproducts may be informative of one or more of the following:

whether the respective material 24 has undergone complete solidification (e.g., whether some of the material 24 that was supposed to be solidified is still in discrete particle/powder form);

whether some of the respective material 24 has been vaporized;

whether some of the respective material 24 has been plasmarized; and likelihood of whether the solidification process will produce porosity defect(s)

within and/or surface defect(s) on the additively manufactured part(s) 22.

The chemical composition and/or the concentration of the solidification byproducts, of course, may also be informative of information other than that described above.

The detection device 29 is adapted to detect one or more of the solidification byproducts (e.g., emissions) released and/or produced during material solidification. The detection device 29 is adapted to detect these solidification byproduct(s) at (e.g., on, adjacent or proximate) a location where the energy beam 36 is sintering or melting the respective material 24. The detection device 29, for example, may be adapted to detect the solidification byproduct(s) (e.g., within region 40) following slightly behind a point 42 where the energy beam 36 is focused on the respective material 24 as illustrated in FIG. 2. However, the detection device 29 may alternatively detect the solidification byproduct(s) on the energy beam 36 focus point 42 where, for example, the energy beam 36 is moving relatively slowly over the material 24.

The detection device 29 may be configured as a spectrometer; e.g., a mass spectrometer. Various types and configurations of spectrometers are known in the art and therefore are not described in further detail. In addition, various chemical detection devices other than that described above are known in the art, and the additive manufacturing system 20 is not limited to any particular ones thereof.

The processing system 30 (or controller) is adapted to receive data from the detection device 29 indicative of the detected solidification byproduct(s). The processing system 30 is also adapted to signal one or more of the system components 27-29 to perform at least a portion of the process described below. The processing system 30 may be implemented with a combination of hardware and software. The hardware includes memory and one or more single-core and/or multi-core processors. The memory may be a non-transitory computer readable medium, and adapted to store the software (e.g., program instructions) for execution by the processors. The hardware may also include analog and/or digital circuitry other than that described above.

Figure 3:
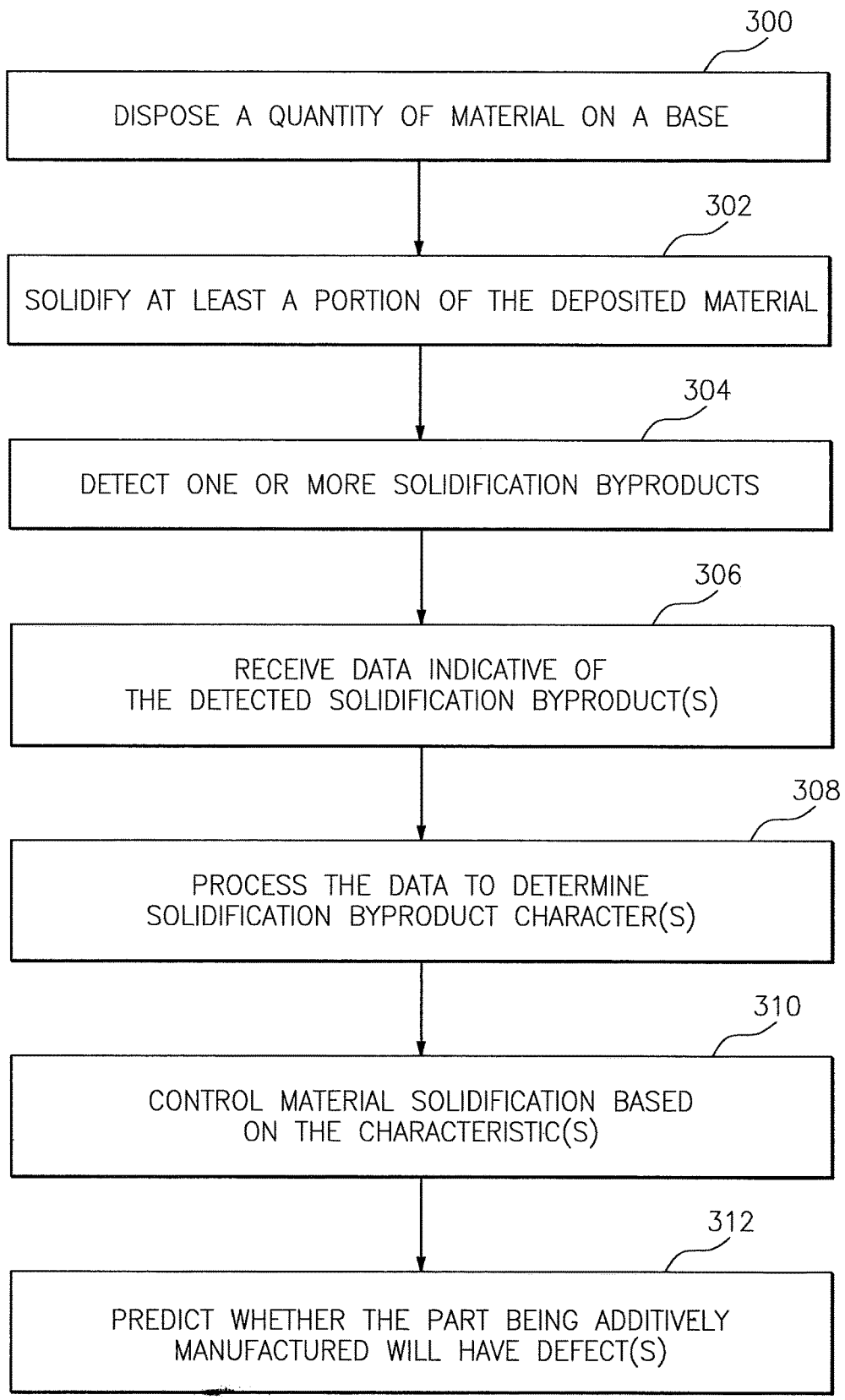
FIG. 3 is a flow diagram for additively manufacturing a part.

FIG. 3 is a flow diagram of a process for additively manufacturing a part 22 (or parts) using an additive manufacturing system such as the system 20. An example of the part 22 is a rotor blade for a turbine engine such as, for example, a turbine blade, a compressor blade or a fan blade. Other examples of the part 22 include a stator blade for a turbine engine, a guide vane for a turbine engine, a gas path wall for a turbine engine as well as various other components included in a turbine engine. The process of FIG. 3 and the system 20, however, may also or alternatively additively manufacture parts other than those described above or included in a turbine engine.

In step 300, a quantity of material 24 is disposed on the base 26. The processing system 30, for example, may signal the material distribution system 27 to deposit a substantially uniform layer of the material 24 on the support surface 34. This layer of material 24 may be deposited directly on the support surface 34. Alternatively, the layer of material 24 may be deposited on at least one layer of material that was previously deposited on the support surface 34.

In step 302, at least a portion of the deposited material 24 is solidified. The processing system 30, for example, may signal the solidification device 28 to selectively scan the energy beam 36 over at least a portion of the deposited material 24 to form at least a portion of the part 22 (see FIG. 2). The energy beam 36 may sinter or melt the respective material 24. The sintered or melted material may thereafter fuse together and solidify providing a solid material mass that forms the respective portion of the part 22. As set forth above, the material 24 may undergo one or more physical and/or chemical changes during the material solidification that release and/or produce one of more byproducts such as, for example, gaseous emissions.

In step 304, one or more of the solidification byproducts are detected. The processing system 30, for example, may signal the detection device 29 to detect the solidification byproducts at a location following the energy beam focus point 42 (see FIG. 2). The detection device 29, for example, may acquire mass spectra for the solidification byproducts. This mass spectra may be indicative of (i) respective species of one or more chemical components in the solidification byproducts and/or (ii) respective concentrations of the chemical components.

Referring to FIGS. 1, 4 and 5, the detection device 29 may acquire the mass spectra along a path 44. A portion of this path 44 that intersects the solidifying and/or solidified material (e.g., the part 22) may be angled relative to the energy beam 36 as illustrated in FIG. 4. Alternatively, a portion of the path 44 that intersects the solidifying and/or solidified material may be substantially parallel and/or co-axial with the energy beam 36.

In step 306, the processing system 30 receives data from the detection device 29. This data may be indicative of one or more of the detected solidification byproducts (e.g., emissions) and, more particularly, the acquired mass spectra.

In step 308, the processing system 30 processes the data to determine one or more characteristics of one or more of the solidification byproducts. The processing system 30, for example, may use known techniques to determine respective species of one or more chemical components in the solidification byproducts from the acquired mass spectra. The processing system 30 may also or alternatively use known techniques to determine respective concentrations of the chemical components within the solidification byproducts from the acquired mass spectra.

In step 310, operation of the solidification device 28 is controlled based on one or more of the characteristics determined in the step 308, or directly from the acquired mass spectra. For example, where one or more chemical component species are present and/or the concentrations of one or more predetermined chemical components pass (above or below) respective thresholds, the processing system 30 may signal the solidification device 28 to change one or more of the following parameters: energy beam power, energy beam pulse repetition rate, energy beam pulse width, energy beam spot size and shape, energy beam hatching spacing (e.g., the space between energy beam travel tracks), and/or energy beam scan speed (e.g., the speed the energy beam 36 moves over the deposited material 24). More particularly, where the determined characteristics indicate the material 24 is being vaporized and/or plasmarized, the processing system 30 may signal the solidification device 28 to lower the energy beam power and/or increase the energy beam scan speed or reduce the energy beam repetition rate to reduce or eliminate material vaporization. Conversely, where the determined characteristics indicate the material 24 is not being fully solidified, the processing system 30 may signal the solidification device 28 to raise the energy beam power and/or decrease the energy beam scan speed, and/or increase the energy beam repetition rate to increase material solidification, and/or rescan the partially solidified area. Specific links between the determined characteristics and the foregoing material solidification traits are material specific and may be determined by one skilled in the art through experimentation.

In step 312, a defect predication is made based on one or more of the characteristics determined in the step 308, or directly from the acquired mass spectra. For example, where one or more predetermined chemical component species are present and/or the concentrations of one or more chemical components pass (above or below) respective thresholds, the processing device may determine the solidification of the material 24 will likely produce one or more defects within the resulting additively manufactured part 22. These defects may include, but are not limited to, surface defects, porosity defects and/or chemical composition defects. Specific links between the determined characteristics and likelihood of the part 22 including defects are material specific and may be determined by one skilled in the art through experimentation.

One or more of the foregoing steps of FIG. 3 may be repeated for one or more iterations to additively manufacture the part 22 (or parts) layer-by-layer.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention.

Accordingly, the present invention is not to be restricted except in light of the attached claims and their equivalents.

What is claimed is:

1. A process for additively manufacturing a part, the process comprising:
   solidifying material with an energy beam to form at least a portion of the part;
   detecting emissions produced by the solidification of at least a portion of the material using a detection device; and
   moving the energy beam over the material, wherein the detection device detects the emissions within a region that follows behind a point where the energy beam is focused on the material;
   wherein the detection device does not detect emissions on the point where the energy beam is focused on the material.

2. A process for additively manufacturing a part, the process comprising:
   solidifying material with an energy beam to form at least a portion of the part;
   detecting emissions produced by the solidification of at least a portion of the material using a detection device; and
   moving the energy beam over the material, wherein the detection device detects the emissions within a region that follows behind a point where the energy beam is focused on the material;
   wherein the detecting of the emissions produced by the solidification comprises acquiring mass spectra along a path that is focused on the region that follows behind the point where the energy beam is focused on the material.

3. A process for additively manufacturing a part, the process comprising:
   solidifying material with an energy beam to form at least a portion of the part;
   detecting emissions produced by the solidification of at least a portion of the material using a detection device; and
   moving the energy beam over the material, wherein the detecting of the emissions produced by the solidification comprises acquiring mass spectra along a path that is focused on a region that moves with a point where the energy beam is focused on the material.

4. The process of claim 3, wherein the region follows behind the point where the energy beam is focused on the material.

5. The process of claim 3, wherein the region is on the point where the energy beam is focused on the material.

6. The process of claim 3, further comprising determining a species of at least one chemical component in the detected emissions.

7. The process of claim 3, further comprising determining a concentration of at least one chemical component in the detected emissions.

8. The process of claim 3, further comprising predicting whether the solidification of the material will produce a defect within the part based on the detected emissions.

9. The process of claim 3, further comprising controlling operation of a device generating the energy beam based on the detected emissions.

10. The process of claim 9, wherein the controlling of the operation of the device comprises controlling power of the energy beam.

11. The process of claim 9, wherein the controlling of the operation of the device comprises controlling pulse width of the energy beam.

12. The process of claim 9, wherein the controlling of the operation of the device comprises controlling spot size of the energy beam.

13. The process of claim 9, wherein the controlling of the operation of the device comprises controlling speed the energy beam moves.

14. The process of claim 9, wherein the controlling of the operation of the device comprises controlling hatch spacing of the energy beam.

15. The process of claim 3, wherein the energy beam comprises a laser beam.

16. The process of claim 3, wherein the energy beam comprises an electron beam.

17. The process of claim 3, wherein the emissions are detected using a spectrometer.

18. The process of claim 3, wherein the path is acutely angled relative to the energy beam.

19. The process of claim 3, wherein the path that is parallel to the energy beam.

* * * * *